(12) United States Patent
Hughes

(10) Patent No.: US 8,490,578 B2
(45) Date of Patent: Jul. 23, 2013

(54) CLUMPED SORBENT MATERIAL

(75) Inventor: Mark B. Hughes, Detroit Lakes, MN (US)

(73) Assignee: Pet Care Systems, Inc., Detroit Lakes, MN (US)

( * ) Notice: Subject to any disclaimer, the term of this patent is extended or adjusted under 35 U.S.C. 154(b) by 920 days.

(21) Appl. No.: 12/578,297

(22) Filed: Oct. 13, 2009

(65) Prior Publication Data

US 2011/0084027 A1    Apr. 14, 2011

(51) Int. Cl.
*A01K 29/00* (2006.01)

(52) U.S. Cl.
USPC .......................................................... 119/171

(58) Field of Classification Search
USPC .......................................................... 119/171
See application file for complete search history.

(56) References Cited

U.S. PATENT DOCUMENTS

| | | |
|---|---|---|
| 327,250 A | 9/1885 | Foulds |
| 3,059,615 A | 10/1962 | Kuceski et al. |
| 3,921,581 A | 11/1975 | Brewer |
| 3,983,842 A | 10/1976 | Marion et al. |
| 4,159,008 A | 6/1979 | Bavaveas |
| 4,206,718 A | 6/1980 | Brewer |
| 4,217,858 A | 8/1980 | Dantoni |
| 4,258,660 A | 3/1981 | Pris et al. |
| 4,341,180 A | 7/1982 | Cortigene et al. |
| 4,405,354 A | 9/1983 | Thomas, II et al. |
| 4,519,340 A | 5/1985 | Dickey |
| 4,571,389 A | 2/1986 | Goodwin et al. |
| 4,685,420 A | 8/1987 | Stuart |
| 4,727,824 A | 3/1988 | Ducharme et al. |
| 4,883,021 A | 11/1989 | Ducharme et al. |
| 4,924,808 A | 5/1990 | Pirotte |
| 4,963,366 A | 10/1990 | Thomas |
| 5,014,650 A | 5/1991 | Sowle et al. |
| 5,109,804 A | 5/1992 | Chikazawa |
| 5,152,250 A | 10/1992 | Loeb |
| 5,176,107 A | 1/1993 | Buschur |
| 5,209,185 A | 5/1993 | Chikazawa |
| 5,216,980 A | 6/1993 | Kiebke |
| 5,230,305 A | 7/1993 | House |
| 5,347,950 A | 9/1994 | Kasbo et al. |
| 5,361,719 A | 11/1994 | Kiebke |
| 5,448,967 A | 9/1995 | Ryan |
| 5,526,770 A | 6/1996 | Kiebke |
| 5,609,123 A | 3/1997 | Luke et al. |
| 5,690,052 A | 11/1997 | Sladek |
| 5,884,584 A | 3/1999 | Feldman |
| 6,014,947 A | 1/2000 | Sladek et al. |
| 6,098,569 A | 8/2000 | Kent et al. |
| 6,220,206 B1 * | 4/2001 | Sotillo et al. .................. 119/171 |
| 6,568,349 B1 * | 5/2003 | Hughes et al. ................. 119/171 |
| 7,776,124 B2 * | 8/2010 | Binder et al. ........................ 71/6 |
| 2003/0200935 A1 * | 10/2003 | Hughes et al. ................. 119/171 |
| 2008/0022939 A1 * | 1/2008 | Bracilovic ..................... 119/171 |
| 2008/0223302 A1 * | 9/2008 | Wang et al. ................... 119/173 |
| 2009/0126644 A1 * | 5/2009 | Thomas et al. ................ 119/171 |
| 2009/0232760 A1 * | 9/2009 | McArthur ..................... 424/76.1 |
| 2012/0094358 A1 * | 4/2012 | Medoff .......................... 435/190 |

FOREIGN PATENT DOCUMENTS

| | | |
|---|---|---|
| EP | 007612281 B1 | 12/1985 |
| FR | 2451159 A | 11/1980 |
| FR | 2598280 | 11/1987 |
| JP | 3021251 A | 1/1991 |
| JP | 5049360 A | 3/1993 |
| NL | 9100418 A | 10/1992 |

* cited by examiner

*Primary Examiner* — Monica Williams
(74) *Attorney, Agent, or Firm* — Husch Blackwell LLP

(57) ABSTRACT

The present invention pertains to a natural product litter composition as well as methods of preparing and using a natural product litter as a sorbent for liquids. The sorbent contains 1 to 10% by weight Aspen particles and 90 to 99% by weight ground grain byproducts including red dog wheat and wheat middlings. The sorbency of a ground grain litter can be improved by pelletization and crumbling.

11 Claims, No Drawings

CLUMPED SORBENT MATERIAL

The present invention pertains to a natural product litter composition and methods for use as a sorbent for liquids. More particularly, this invention refers to clumped sorbent.

BACKGROUND

The use of litter as a sorbent for pet animal urine and other waste liquids has been known for years. Typically, the litter is placed into a container or in an area in which the pet has been trained to use for urinating and defecating. Many prior art litters have been derived from sand, clay, and other minimally sorbent materials. More recently the useful life and sorbency of these litters has been increased by addition of binders and other additives which cause a clump to form from litter soiled by urine and fecal liquids. See e.g., U.S. Pat. Nos. 5,216,980 and 5,176,107. Formation of soiled litter into a clump, in part, minimizes the spread of urine or fecal liquids thus minimizing contamination of the unsoiled litter surrounding the excreted waste liquids. Additionally, clumping reduces the tracking of the soiled litter out of the litter container.

More recently, natural products such as grains, cellulosic products such as sawdust, woodchips or plant hulls have been used as a litter. See eg, U.S. Pat. Nos. 4,206,718; 4,727,824; 4,883,021; 5,109,804; 5,152,250; 5,690,052; 6,014,947. These natural products were developed in an effort to enhance the sorbency of the litter as well as provide a biodegradable litter. Litters with higher sorbency can minimize odors, reduce the amount of litter required and minimize disposal problems of the wetted litter. Although highly sorbent litters have been prepared, many of them tend to swell excessively when contacted with liquids causing problems such as blockage of sewer or septic lines when flushed down a commode.

The present invention is directed to providing a highly sorbent natural product litter with low swelling and suitable clumping characteristics. The invention also provides methods for preparing and using natural product litters with high sorbency, low swelling and suitable clumping characteristics.

SUMMARY OF THE INVENTION

The present invention provides an improved natural product sorbent composition. The sorbent can be a mixture of up to 99% by weight ground wheat byproducts and 1 to 10% by weight wood particles. The sorbent is biodegradable, scoopable and flushable. The ground wheat by products are typically a mixture of red dog wheat, the offal from the tail of the mill, and wheat middlings. The wood particles are typically derived from Aspen trees. The wood particles typically sorb an amount of liquid based on weight equal to at least about 1.0 times and preferably at least about 2.0 times and more preferably at least about 3.0 times the weight of the sorbent. Preferably, the wood particles are sawdust or wood chips that are smaller than about 4 mm. A preferred composition is one in which the ground grain byproducts are red dog wheat and wheat middlings and the wood particles are Aspen. Upon contact with a liquid, the sorbent can sorb an amount of liquid based on weight equal to at least about 1.0 times and preferably at least about 1.5 times and more preferably at least about 2.0 times the weight of the sorbent.

The invention also provides a method for preparing a sorbent containing 1 to 10% by weight wood particles and up to 99% by weight ground grain byproducts. After selection of wood particles and ground grain byproducts, a litter mixture is prepared. In one embodiment, the litter mixture is pelletized. In another embodiment, the pellets are crumbled.

In another embodiment, the invention provides a method for producing a pelletized sorbent from ground grain byproducts. The ground grain byproduct pellet may contain additives including, for example, wood particles to improve sorbency, deodorants, agents to inhibit microbial growth, anti-dusting agents and animal attractants. In one embodiment, the pellets are crumbled.

The invention also provides a method for sorbing liquid using a sorbent containing ground grain byproducts and wood particles. Ground grain byproducts and wood particles are selected and mixed to produce a litter mixture. The mixture contains 90 to 99% by weight of ground grain byproducts and 1 to 10% by weight of wood particles. The litter is situated such that a liquid to be sorbed can contact it. Upon contact with the liquid, the litter mixture preferably forms a clump and sorbs an amount of liquid based on weight equal to at least about 1.0 times and preferably at least about 1.5 times and more preferably at least about 2.0 times the weight of the litter mixture.

DETAILED DESCRIPTION

The present invention provides an improved natural product sorbent composition and methods for sorbing liquids. The sorbent composition can be a litter mixture of ground grain byproducts and wood particles and more specifically a combination of red dog wheat, wheat middlings and Aspen wood particles. Preferably, the sorbent has low odor and is biodegradable. Upon contact with a liquid, the sorbent can form a low attrition clump that is easily separated from the surrounding unwetted sorbent. When the sorbent is disposed of down a commode, the clumps can break down. The sorbent typically has a low tendency to swell, thus reducing the likelihood of plugging a sewer or septic system upon disposal.

Wheat middlings, a byproduct of wheat processing, are generally known as the organic material that remains after the milling of wheat grain and the resulting extraction of wheat flour. The composition of wheat middlings is somewhat variable depending upon the quality of the parent grains, the specific mill operation and the desired final product.

Red dog wheat comprises offal from the tail of the mill, together with some fine particles of wheat bran, wheat germ and wheat flour. Red dog wheat can act as a pellet binder. Preferred grains of the invention may be selected from a group of wheat varieties including white wheat, spring wheat, winter wheat, durum and the like. In one preferred embodiment, the ground grain is hard red spring wheat.

The ground grain is prepared by grinding whole raw grain and removing the offal. Prior to grinding, the whole raw grain can be put through a cleaning device to remove foreign materials including stones, rocks, metal, dirt, dust, weed seed and other nongrain material. Such cleaning devices are known in the art and include, for example, magnets, disk cleaning mills, sieve cleaning mills and similar devices. The grain may then optimally be subjected to disinfestation using an infestation destroyer. The order in which the grain is cleaned and disinfested is not important. Infestation destroyers are known in the art.

After the grain is cleaned and disinfested, it is subjected to a roller or a hammer mill to crush the whole grain into smaller particles. After the grain is crushed (ground) it moves into a sifter where large particles are separated by passing through a mesh sieve and returned to the roller or hammer mill. The offal from the tail of the mill is recovered as a fine flour, light colored ingredient.

Wood particles of the invention can be produced, for example, by grinding, milling, or cutting. The source of wood can be, for example, trees, timber, cellulose fibers, or wood by-products such as bark and wood shavings. Aspen wood is the wood type that can be used.

Typically, the Aspen particles are sorbent materials that can sorb an amount of liquid in weight between about 0.5 times to about 5.0 times the weight of the Aspen particles. The Aspen particles typically can sorb an amount of liquid equal to at least 1 times and preferably 2 times and more preferably at least 3 times the weight of the Aspen particles. Sorption includes both adsorption and absorption of the liquid into or onto the wood particles.

The Aspen particles typically are obtained by grinding or milling. The wood particles may be derived from a pelletized or ground wood product. Sources of ground and pelletized Aspen products include Green Pet Products, Conrad, IA and Lone Tree By-Products, Bagley, Minn. The particle size of the Aspen is typically reduced such that at least 95% of the particles are less than about 4 mm (pass through a 5 mesh screen). Preferably, at least 95% of the particles are between about 4 mm and about 125 .mu.m (pass through a 5 mesh screen but not a 120 mesh screen).

One aspect of the invention provides a sorbent composition comprising about 90 to 99% by weight of ground grain byproducts and 1 to 10% by weight of Aspen particles. The composition preferably comprises about 1 to about 8% wood particles and more preferably comprises about 1% wood particles. The ground grain byproducts preferably comprise about 92 to 99% by weight ground grain byproducts and more preferably about 99% by weight ground grain byproducts. The ground grain byproducts may further comprise 65-47% red dog wheat and 25% what middlings, and preferably 74% red dog wheat and 25% wheat middlings. Other additives may be present including, for example, compounds that function as deodorants, agents to inhibit microbial growth, anti-dusting agents and animal attractants. Additives to mask or neutralize odors, for example, can be baking soda or natural products oils such as Nilecho (a natural product oil product containing 50 natural oils sold by Nilodor, Inc., Bolivar, Ohio). Animal attractants, for example, can be natural proteins such as wheat. Anti-dusting agents, for example, can be a vegetable oil such as soybean oil.

In one embodiment, the sorbent can sorb an amount of liquid based on weight between about 0.5 times and about 5.0 times the weight of the sorbent. Typically, the sorbent can sorb an amount of liquid based on weight equal to at least 1.0 times and preferably at least 1.5 times and more preferably at least 2.0 times the weight of the litter mixture. As used herein, "sorption" includes both adsorption and absorption of the liquid into or onto the sorbent. Sorbency can be measured using ASTM Standard F 726-99 (published in 1999) for a Type II sorbent. Water is placed in the test cell, a glass crystallizing dish. A sample of the sorbent is weighed, placed in a wire mesh basket (27 mesh size −0.063"-0.16 cm) and lowered into the test cell. Some of the sorbent will float within the test cell. After 15 minutes, the sorbent is removed from the water using the mesh basket. The basket is allowed to drain for 30 minutes. The sorbent is weighed again to calculate the amount of liquid sorbed.

The sorbent of the subject invention tends to form a low attrition clump upon contact with liquids. If the wood particle content gets too high, the litter will not clump upon exposure to liquid waste. The phrase "low attrition clump" means a clump that, after drying, loses less than about 15% of its weight and preferably less than about 10% of its weight when subjected to attrition testing. Attrition testing involves wetting the litter mixture with 6 grams of water and allowing the sorbed water to set for 10 to 15 minutes. The clumps that form are carefully removed from the nonwetted litter and dried. The dried clumps are weighed. Then the bonded but poorly adhered litter on the surface of the clumps is removed by gently rubbing a finger across the surface. The removed litter is weighed to calculate the % weight loss. The % weight loss is the % attrition.

Low attrition clumps are advantageous because they are less likely to lose particles of soiled litter when the clump is removed from the surrounding unsoiled litter in a litter container. A low attrition clump can provide a significant advantage by increasing the useful life of the litter through decreased contamination of the unsoiled litter by soiled litter falling away from the clump. Additionally, clumping prevents particles from breaking off a soiled clump if subjected to compression by an animal stepping on the clumps while moving around in the litter. The tracking of the litter outside the litter container can be minimized.

The sorbent composition tends to swell less than some other natural product litters. As used herein, "swell" means the tendency of the litter to increase in volume when contacted with a liquid. This attribute is particularly beneficial if the soiled litter is flushed down a commode attached to a sewer or septic system. By using a litter that swells less upon contact with liquids, sewer or septic systems have fewer tendencies to become blocked or plugged when the litter is flushed down a commode. Compositions with greater than about 50% wood particles based on the weight of the litter tend to swell more than preferred. A litter that swells 100% means that the sorbent doubles in volume upon contact with the water. Compositions of this invention typically swell less than about 10% based on the volume of the sorbent. The sorbent preferably has no volume change on exposure to a liquid and most preferably shrinks upon contact with liquid.

Another aspect of the invention provides a method for producing a sorbent comprising 1 to 10% by weight Aspen particles and 90 to 99% by weight ground grain byproducts. Preferably, the sorbent comprises 1 to 8% Aspen particles and more preferably comprises 1% Aspen particles, while the ground grain byproducts preferably comprise 92 to 99% by weight and more preferably 99%. The ground grain byproducts may further comprise 65-74% red dog wheat and 25% what middlings, and preferably 74% red dog wheat and 25% wheat middlings. The selected ground grain and wood particles are mixed to form a homogeneous litter mixture. Suitable mixing equipment includes, for example, ribbon or paddle mixers. The homogeneity can be determined visually based on color similarity and color uniformity for samples taken from several locations in the mixing vessel.

One embodiment of the invention provides a pelletized litter. A typical pelletizer has a feeder for the dry components and a conditioner where liquids are added. The conditioned material then flows into the pelleting chamber where the pellet is formed. Varying the compression ratio, moisture content and temperature during pelletization can alter the product characteristics. The compression ratio is typically between about 4:1 and about 9:1. Preferably, the compression ratio is between about 5:1 and about 9:1 and most preferably between about 5:1 and about 8:1. Poor pellets containing a large number of fines are formed at a compression ratio less than about 4:1. The product characteristics can be difficult to reproduce when compression ratios less than about 5:1 are used. Higher amounts of water are needed to form pellets with a compression ratio of 5:1 or less. This amount of water is disadvantageous because more drying of the pellet is required after formation. Good pellets can be formed with smaller amounts of added water at compression ratios greater than about 5:1.

The moisture required for pelletization can be added during the mixing step of the ground grain and wood particles, after the mixing step but in the same vessel used for mixing, or as part of the pelletization process. Preferably, the moisture is added as part of the pelletization process. Lower levels of moisture addition are preferred to minimize the amount of drying required after pelletization. Typically, the moisture content of the litter after mixing ranges from about 7 wt. to about 14 wt. % based on the weight of the litter. Preferably, the moisture level during pelletization is below about 15 wt. % and more preferably below about 13 wt. % based on the weight of the litter. When compression ratios of 5:1 or less are used, the total water needed to form pellets is in the range of 15 wt. % to about 18 wt. % based on the weight of the litter.

The pelletization temperature preferably is less than the boiling point of water. If the temperature is too high, steam forms decreasing the processability of the materials. Higher temperatures tend to produce pellets with hard shells reducing the sorbency of the litter. If the ground grain is wheat, temperatures in excess of 180° F. (82° C.) can cause gelatinization and decrease the ability of the litter to clump upon exposure to a liquid. Preferably, the pelletization temperature is between about 110° F. (43° C.) and 170° F. (77° C.). More preferably, the pelletization temperature is between about 130° F. (54° C.) and about 170° F. (77° C.).

After formation, the pellets can be dried, for example, in a cooler or a dryer. Cooling can occur by air movement created by a fan. The dryer can be, for example, a fluid bed. Drying can be done in the presence of air or an inert gas. The temperature of the gas exiting the dryer is typically less than 180° F. (82° C.). The final moisture typically is less than about 12 weight %, preferably less than about 11 weight % and more preferably less than about 9 weight %. Lower moisture content minimizes microbial growth in the final product.

Any fines produced can be returned to the pelletizer for re-processing. The typical bulk density of the pellets is between about 0.40 g/cc and about 0.80 g/cc. In one embodiment, the preferred bulk density is about 0.50 g/cc to 0.65 g/cc.

The pellet can be any size that provides the desired sorbency function. Typically, the pellet diameter is between about 1/8" (0.32 cm) and about 1/2" (1.28 cm) and preferably between about 5/32" (0.40 cm) and about 1/4" (0.64 cm). The pellet length typically is between about 2/3" (1.70 cm) and about 1/3" (0.85 cm) and preferably between about 1/2" (1.28 cm) and about 7/16" (1.11 cm).

In another embodiment, the pelletized litter can be crumbled. Crumbling is a process of milling the pelletized litter in a crumbler or roller mill to produce smaller particles. The gap between the rolls determines the size of the crumbled product. A typical range of crumbling is such that a pellet is reduced from about one-fourth to about three-fourths and preferably from about one-half to about two-thirds of the original pellet size. The objective of crumbling is to reduce the size of the pellets without creating a large number of fines.

One aspect of the invention provides a method for preparing pellets comprising ground grain. The ground grain may contain additives that function, for example, to mask or neutralize waste odors, to provide an attractant for an animal, to inhibit bacterial growth or to decrease dust formation. Additives to mask or neutralize odors, for example, can be baking soda or natural products oils such as Nilecho (a natural product oil product containing 50 natural oils sold by Nilodor, Inc., Bolivar, Ohio). Animal attractants, for example, can be natural proteins such as wheat. Anti-dusting agents, for example, can be a vegetable oil such as soybean oil.

In another embodiment, the pellets are crumbled. According to this embodiment, the crumbled litter typically can sorb an amount of liquid based on weight between about 0.5 times to about 5.0 times the weight of the litter. The litter typically sorbs an amount of liquid based on weight equal to at least about 1.0 times and preferably at least about 1.5 times and more preferably at least about 2.0 times the weight of the litter. The swelling is less than about 10% based on the volume of the litter. Preferably there is no volume change or more preferably the litter shrinks upon contact with liquid. The % attrition is typically less than about 15% and preferably less than about 10%.

Another aspect of the invention provides a method of sorbing liquid using a sorbent comprising ground grain and wood particles. Ground grain and wood particles are selected and mixed to produce a litter mixture. The mixture contains from up to 99% by weight of ground grain byproducts and from 1 to 10% by weight of Aspen particles. The mixture preferably comprises about 1 to about 8% Aspen particles and more preferably comprises about 1% Aspen particles. The ground grain byproducts are typically from 90 to 99% byproducts by weight, preferably 92 to 99% by weight and most preferably 99% by weight. These wheat byproducts may comprise 67 to 74% red dog wheat by weight and wheat middlings. More preferably there would be 74% red dog wheat with 25% wheat middlings. The litter may contain additives that function, for example, to mask or neutralize waste odors, to provide an attractant for an animal, to inhibit microbial growth or to prevent dust formation. The litter is situated such that a liquid to be sorbed can contact it. Upon contact with the liquid, the litter mixture sorbs an amount of liquid based on weight equal to at least about 1.0 times and preferably 1.5 times and more preferably at least 2.0 times the weight of the litter mixture. Typically the litter sorbs an amount of liquid based on weight between about 0.5 times and 5.0 times the weight of the litter.

Another aspect of the invention provides a method of sorbing liquid by preparing a litter comprising ground grain. The ground grain may contain additives that function, for example, to mask or neutralize waste odors, to provide an attractant for an animal, to inhibit bacterial growth or to prevent dust formation. The ground grain litter may include additives such as Aspen particles to enhance sorbency. The litter is pelletized and optionally crumbled. The pelletized or crumbled litter mixture is situated such that it is actually contacted by a liquid.

The following tests investigated absorbent ability of litter, clumping efficiency and depth, and ammonia control.

Crumble sorbency is always a main focus of cat litter evaluation. Sorbent testing was performed following ASTM F-726 9.3.2. A slight modification for this test was made due to the property of the 1% Aspen blend to retain water in the cups we have used in our lab to test sorbency. It was found that it took at least 2 minutes, rather than 30 seconds, for most of the water to drain from the cup that had sat in water for 30 minutes. Therefore, in the interest of measuring the amount of water adsorbed by the litter blends, and not measuring water that had no time to flow from the product due to the structure of the soaking and draining container, the draining time was increased for all tests from 30 seconds to 2 minutes. Table 1 represents cat litter blends tested for their adsorbency. Four repetitions for each blend were performed for the test. The wheat blends in all tests comprised original formula (15% wheat middlings, 85% ground spring wheat) 100% hard red spring wheat, 100% red dog wheat, 1% and 5% Aspen with hard red spring wheat.

TABLE I

| Blend | Water adsorbed/product used (g/g) |
|---|---|
| Red Dog Wheat and Middlings | 1.38 |
| Red Dog | 3.38 |
| 1% Aspen | 3.64 |
| 5% Aspen | 3.12 |

Clumping efficiency is defined as the amount of litter material required to sorb 5 ml of water. Test product is placed in a glass dish and filled 4" deep. Five millimeters of water at 100° F. +/−0.5° F. is then added to the samples and left to sorb for thirty (30) minutes. The product clump is then removed and weighed. In this case, a lower amount of product required to bind 5ml of liquid represents a more sorbent product.

Depth of the litter clump required to sorb 5 ml of water was also evaluated to provide additional information for comparing performance characteristics of the four little blends. Results for both adsorbency mass and depth are included in Table II.

TABLE II

| Blend | Mass (g) | Depth (in.) |
|---|---|---|
|  | 9.15 | 0.98 |
| Red Dog | 7.70 | 1.41 |
| 1% Aspen | 6.33 | 1.29 |
| 5% Aspen | 6.36 | 1.08 |

Ammonia control was also conducted. The ability of the litter blends to mask or control the release of ammonia is a critical characteristic required in cat litter. The tests conducted utilitzed ammonium hydroxide to evaluate litter performance. Ammonium hydroxide is a very concentrated form of ammonia. Testing was conducted utilizing a Dragger air monitor and ammonia test tubes with the capacity to read 0.25-70 ppm ammonia. Testing involved applying five millimeters of ammonium hydroxide to four inches of crumbled material. Results are shown in Table III.

TABLE III

| Blend | 10 minutes (ppm) | 20 hours (ppm) |
|---|---|---|
| Orignial | 57* | 0.45 |
| Red Dog | 21 | 0.40 |
| 1% Aspen | 42 | 0.23 |
| 5% Aspen | 37 | 0.27 |

*2/3 results over 70 ppm

All three alternative blends adsorbed more water.

The following examples further describe the method for preparing a ground grain litter of the invention and the tests performed to determine the various characteristics of the litter. In the following examples, the ground grain is wheat and the wood particles are Aspen; the invention is not limited to these materials. The examples are provided for exemplary purposes to facilitate understanding of the inventions and should not be construed to limit the invention to the examples.

EXAMPLES

Example 1

Characterization of Aspen and Ground Wheat Starting Materials

In this example, the Aspen starting material is a by-product of the lumber milling industry. Wood chips are dried in a tumble dryer to about 8 wt. % moisture based on the weight of the wood chips. The dried chips are ground in a dual stage hammer mill with an 8-mesh screen. The ground wheat byproducts comprise red dog wheat and wheat middlings that are ground in a single head roller mill with a 10-mesh screen.

The particle size distribution of the wood particles and ground wheat is determined by shaking the samples for 5 minutes in a series of sieves ranging in size from 4 mm to 125 µm. The particle size distribution of the ground wheat and Aspen are shown in Table IV. All of the ground wheat and 97% of the wood particles are less than 4.0 mm. Only 1% of each raw material is smaller than 125 µm.

TABLE IV

Particle Size Distribution of Ground Wheat and Aspen

| Screen Size | Aspen - % Retained | Ground Wheat Byproducts - % Retained |
|---|---|---|
| No. 5-4.0 mm | 3 | 0 |
| No. 7-2.8 mm | 18 | 0 |
| No. 10-2.0 mm | 28 | 1 |
| No. 25-707 µm | 36 | 83 |
| No. 45-354 µm | 10 | 10 |
| No. 60-250 µm | 2 | 3 |
| No. 80-177 µm | 1 | 1 |
| No. 120-125 µm | 1 | 1 |
| <125 µm 11 | 1 | 1 |

The bulk density for the starting materials was determined by dividing the weight in grams of a sample by the volume of the sample in milliliters. After the sample was weighed, it was put into a measuring cylinder and tapped gently until no further settling was observed. The volume was then read. The ground wheat has a higher bulk density than Aspen as shown in Table V.

The sorbency of the litter mixture, wood particles, and ground grain was determined using ASTM Standard Method F 726-99 (published in 1999) for type II adsorbents. Water was placed in the test cell, a glass crystallizing dish. A sample of the litter was weighed, placed in a wire mesh basket (27 mesh size −0.063"-0.16 cm) and lowered into the test cell. Some of the sorbent floated within the test cell. After 15 minutes, the sorbent was removed from the water using the mesh basket. The basket was allowed to drain for 30 minutes. The sorbent is weighed again to calculate the amount of liquid sorbed. Table V shows the sorbency for Aspen and ground wheat. Aspen sorbed an amount of water greater than 2.5 times the weight of the Aspen. The ground grain sorbed an amount of water just slightly less than the weight of the ground grain.

Upon exposure to water, the ground wheat forms a clump but the Aspen does not.

TABLE V

Bulk Density and Sorbency of Aspen and Ground Wheat Byproducts

| Raw Material | Bulk Density, g/cc | Start Wt. (g) | End Wt. (g) | Water Sorbed (g) | g Water Sorbed/g Sorbent |
|---|---|---|---|---|---|
| Aspen | 0.509 | 25.3 | 97.7 | 72.4 | 2.86 |
| GW | 0.570 | 25.1 | 49.4 | 24.3 | 0.97 |

Example 2

Preparation of Mixtures of Ground Grain and Aspen

The ground grain and Aspen from Example 1 are mixed in proportions of 1 and 5% Aspen in the mixture. The ground grain comprises hard red spring wheat. A ribbon mixer is used to combine the materials. Mixing is continued until three samples pulled from different regions of the mixing vessel had the same color and color uniformity.

The sorbency of the samples is determined using ASTM Standard F-726-99 for type II adsorbents. The sorbency values are reported in Table VI.

TABLE VI

Sorbency of Ground Grain/Aspen Mixtures

| Product | Start Wt. (g) | End Wt. (g) | Water Sorbed (g) | g Water Sorbed/g Sorbent |
|---|---|---|---|---|
| 100% red dog | 25.1 | 58.3 | 33.2 | 3.38 |
| GW/1% Aspen | 25.1 | 52.7 | 27.6 | 3.64 |
| GW/5% Aspen | 25.4 | 53.6 | 28.2 | 3.12 |

The addition of only 5% Aspen to the ground grain increased the sorbency over 1% and the addition of 10% Aspen increased the sorbency over 5% compared to the ground grain alone.

Example 3

Pelleted Ground Wheat/Aspen Litter

A litter mixture containing 1% Aspen, 74% red dog wheat and 25% wheat middlings based on the weight of the mixture is prepared by mixing the ground wheat and Aspen as described in Example 2. The mixture was formed into pellets with a diameter of ³⁄₁₆" (0.48 cm). The pellets were then crumbled to two-thirds of the original size of the pellets. For these samples, lower compression ratios improve the sorbency of the litter mixture.

Example 4

Crumbled Ground Wheat/Aspen Litter

A litter mixture containing 8% Aspen, 67% red dog wheat and 25% wheat middlings based on the weight of the mixture is prepared by mixing the ground wheat and Aspen as described in Example 2. The mixture is formed into pellets with a diameter of either ³⁄₁₆" (0.48 cm) or ⁵⁄₃₂" (0.40 cm). The moisture content before pelletization is 15 wt. % and the exit temperature from the pelletizer is between 130° F. (54° C.) and 135° F. (57° C.). The pellets are then crumbled to either one-half or two-thirds of the original size of the pellets. Crumbling increases the sorbency of the materials. With a compression ratio of 5:1, one gram of crumbled product can sorb more of a liquid compared to the same quantity of pelletized product.

From the foregoing detailed description it will be evident that modification can be made in the devices and methods of the invention without departing from the spirit or scope of the invention. Therefore, it is intended that all modifications and variations not departing from the spirit of the invention come within the scope of the claims and their equivalents.

What is claimed is:

1. A sorbent composition for sorbing a liquid, the sorbent comprising a pellet or crumpled pellet comprising:
   (a) ground grain byproducts including 25% by weight wheat middlings and 65 to 74% by weight red dog wheat; and
   (b) 1 to 10% by weight of Aspen particles, said sorbent swelling less than about 10% based on the volume of the sorbent when sorbing a maximum amount of liquid.

2. The sorbent composition of claim 1, wherein the Aspen particles sorb an amount of liquid based on weight between about 0.5 times to about 5 times the weight of the Aspen particles.

3. The sorbent composition of claim 1, wherein the ground grain byproducts is prepared from hard red spring wheat.

4. The sorbent composition of claim 1, wherein the sorbent comprises about 1% by weight Aspen particles.

5. The sorbent of claim 1, wherein the sorbent can sorb an amount of liquid based on weight equal to about 0.5 times to about 5 times the weight of the sorbent.

6. The sorbent composition of claim 1, wherein the sorbent clumps upon contact with the liquid.

7. The sorbent composition of claim 1 including 8% Aspen particles and the ground grain by products include 67% red dog wheat.

8. The sorbent composition of claim 1 including 1% Aspen particles and the ground grain by products include 74% red dog wheat.

9. A particulate sorbent comprising a homogeneous mixture, about 1 to about 10% by weight ground Aspen particles and ground grain byproducts including 25% by weight wheat middlings and 65 to 74% by weight red dog wheat, said sorbent swelling less than about 10% based on the volume of the sorbent when sorbing a maximum amount of liquid.

10. The particulate sorbent of claim 9 that contains about 1% by weight Aspen particles.

11. The particulate sorbent of claim 9 that has no volume change on sorbing a maximum amount of liquid.

* * * * *